(12) United States Patent
Humphrey, Jr. et al.

(10) Patent No.: US 8,129,015 B2
(45) Date of Patent: Mar. 6, 2012

(54) MODIFIED MOLDABLE URETHANE WITH TUNABLE HAPTICS

(75) Inventors: William McHugh Humphrey, Jr., Dover, NH (US); Rose Ryntz, Clinton Township, MI (US)

(73) Assignee: International Automotive Components North America, Inc., Dearborn, MI (US)

( * ) Notice: Subject to any disclaimer, the term of this patent is extended or adjusted under 35 U.S.C. 154(b) by 434 days.

(21) Appl. No.: 12/465,945

(22) Filed: May 14, 2009

(65) Prior Publication Data

US 2010/0291366 A1 Nov. 18, 2010

(51) Int. Cl.
B32B 27/32 (2006.01)
B29C 41/18 (2006.01)
C08K 3/36 (2006.01)
C08L 53/00 (2006.01)

(52) U.S. Cl. ....... 428/220; 525/445; 525/92 B; 264/101; 264/302

(58) Field of Classification Search .................. 428/220; 264/445, 302, 101
See application file for complete search history.

(56) References Cited

U.S. PATENT DOCUMENTS

| | | | |
|---|---|---|---|
| 3,933,937 A * | 1/1976 | Rhodes et al. | 528/75 |
| 5,824,738 A | 10/1998 | Humphrey et al. | |
| 5,936,023 A * | 8/1999 | Kato et al. | 524/445 |
| 6,076,246 A | 6/2000 | McCooey | |
| 6,107,404 A * | 8/2000 | Ryntz | 525/191 |
| 6,166,139 A * | 12/2000 | Ryntz | 525/191 |
| 6,187,859 B1 | 2/2001 | Humphrey et al. | |
| 6,280,816 B1 | 8/2001 | McCooey | |
| 6,409,493 B1 | 6/2002 | MacDonald et al. | |
| 6,410,638 B1 | 6/2002 | Kaufhold et al. | |
| 6,524,509 B1 | 2/2003 | Shope et al. | |
| 6,632,525 B1 | 10/2003 | Farrington et al. | |
| 6,709,619 B2 | 3/2004 | MacDonald et al. | |
| 7,160,496 B2 | 1/2007 | Patel et al. | |
| 2001/0011784 A1 | 8/2001 | Valligny et al. | |
| 2002/0019487 A1 | 2/2002 | Valligy et al. | |

(Continued)

FOREIGN PATENT DOCUMENTS

EP 1 050 549 A2 11/2000

(Continued)

OTHER PUBLICATIONS

Leandro Pizzatto et al., "Synthesis and Characterization of Thermoplastic Polyurethane/Nanoclay Composites", Materials Science and Engineering C29 (2009), pp. 474-478.

European Search Report Dated Aug. 20, 2010, Application No. 10155182.8-2115, Applicant International Automotive Components Group North America, Inc., 7 Pages.

Primary Examiner — David Sample
Assistant Examiner — Tahseen N Khan
(74) Attorney, Agent, or Firm — Brooks Kushman P.C.

(57) ABSTRACT

The present invention relates to a slush moldable polymeric composition for forming a skin useable in interior trim components and methods of making the same. In at least one embodiment, the composition comprises a) from 50 to 99 wt. percent urethane elastomer, b) from 0.1 to 15 wt. percent propylene copolymer, c) from 0.1 to 25 wt. percent olefin modified thermoplastic, such as SEBS, and d) from 0.1 to 30 weight percent olefinic block copolymer, wherein the polymeric composition is slush moldable and vacuum formable. The modifiers include an olefin block copolymer (OBC) having a variable distribution of block lengths. The OBC is present in an amount from 0.1% to 30% of the total composition. The haptics of the polymeric composition is tunable by adjusting the amounts of the modifiers.

20 Claims, 3 Drawing Sheets

U.S. PATENT DOCUMENTS

| | | |
|---|---|---|
| 2002/0095006 A1* | 7/2002 | Ryntz et al. .................. 524/261 |
| 2005/0031870 A1* | 2/2005 | Liu et al. ...................... 428/402 |
| 2006/0106147 A1* | 5/2006 | Fasulo et al. ................. 524/445 |
| 2006/0142531 A1 | 6/2006 | Peerlings et al. |
| 2006/0173115 A1* | 8/2006 | Fudemoto et al. ........... 524/445 |
| 2007/0049720 A1 | 3/2007 | Krause et al. |
| 2007/0055005 A1* | 3/2007 | Ottaviani et al. ............ 524/543 |
| 2008/0182928 A1 | 7/2008 | Grahl et al. |
| 2008/0269412 A1 | 10/2008 | Carnahan et al. |
| 2008/0269419 A1 | 10/2008 | Hustad |
| 2008/0311812 A1 | 12/2008 | Arriola et al. |

FOREIGN PATENT DOCUMENTS

| | | |
|---|---|---|
| WO | 2008077146 A1 | 6/2008 |
| WO | 2009/023130 A2 | 2/2009 |
| WO | 2009023131 A2 | 2/2009 |
| WO | 2009023138 A3 | 2/2009 |
| WO | WO 2009023130 A2 * | 2/2009 |

* cited by examiner

MODIFIED MOLDABLE URETHANE WITH TUNABLE HAPTICS

BACKGROUND OF THE INVENTION

1. Field of the Invention

The present invention relates to moldable polymeric compositions that are useful for making instrument panel skins and other trim panel components used in automobile interiors.

2. Background Art

The way automotive interior components feel to the touch is often called the "haptics" or "hand." Haptics are very important to consumers in automotive interior components. To manufacture items with quality haptics, slush molding is often used since it allows for high quality textures to be produced that are similar in desirability to leather, which is often considered to have a desirable and/or luxurious feel. Different components may have different desired haptics, however, so one composition or process may not be suitable for all parts.

It is also important for components that are part of the air bag systems to have suitable physical and material properties to perform adequately at low temperatures, for example −30° C. In addition to slush molding, vacuum forming and spray urethane are often used to make interior components. However, vacuum forming and spray urethane do not generally perform as well in air bag components at −30° C. and do not typically have as desirable a "hand" as slush molded components.

Accordingly, a slush moldable polymeric composition with desirable haptics that performs well in low temperature air bag tests would be beneficial.

SUMMARY OF THE INVENTION

In one aspect of the invention, a moldable polymeric composition is provided. In at least one embodiment, the polymeric composition comprises:
- a) from 50 to 99 wt. percent urethane elastomer;
- b) from 0.1 to 15 wt. percent propylene copolymer;
- c) from 0.1 to 25 wt. percent olefin modified thermoplastic, such as SEBS; and
- d) from 0.1 to 30 weight percent olefinic block copolymer;

In another aspect of the invention, a vehicle skin is provided. In at least one embodiment, the skin comprises the dried product of
- a) from 50 to 99 wt. percent urethane elastomer;
- b) from 0.1 to 15 wt. percent propylene-ethylene copolymer;
- c) from 0.1 to 25 wt. percent SEBS; and
- d) from 0.1 to 30 wt. percent olefinic block copolymer; and
wherein the skin has a thickness from 0.3 to 3.0 mm and a Shore A hardness from 60 to 90.

DETAILED DESCRIPTION OF THE PREFERRED EMBODIMENT(S)

Figure 1A:
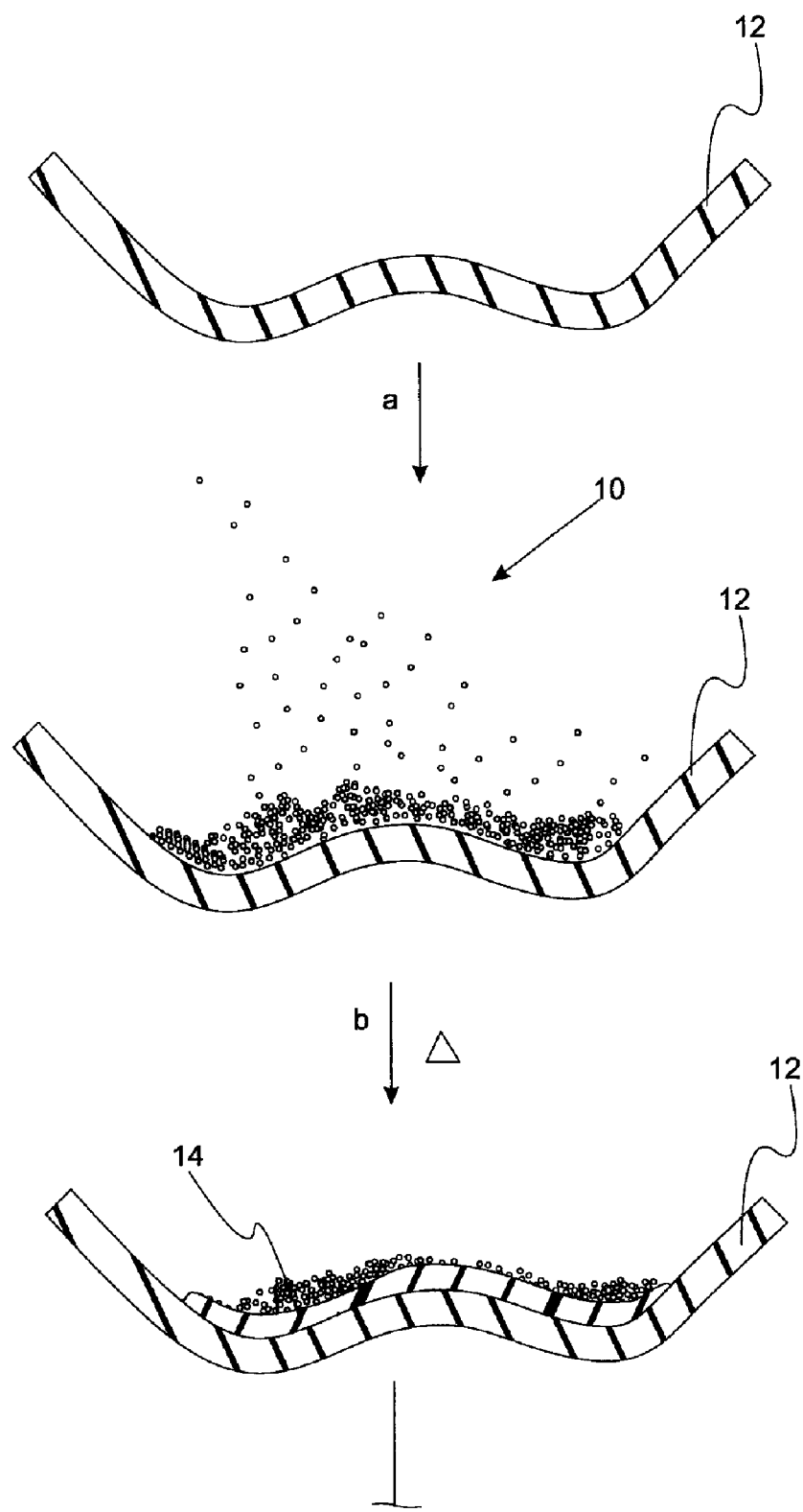
FIGS. 1A and 1B together illustrate pictorial flowchart depicting an embodiment for forming an instrument panel skin.

Reference will now be made in detail to presently preferred compositions, embodiments and methods of the present invention, which constitute the best modes of practicing the invention presently known to the inventors. The Figure is not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for the claims and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; and the first definition of an acronym or other abbreviation applies to all subsequent uses herein of the same abbreviation and applies mutatis mutandis to normal grammatical variations of the initially defined abbreviation.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

A slush moldable polymeric composition that has tunable haptics is hereby provided. Density and Shore A hardness can be used as indicators of the haptics for automotive interior components. By adjusting the amount of individual modifiers (each having a density and Shore A hardness) in the slush moldable polymeric composition, the haptics of the composition can be adjusted to the desired feel for a component.

An automotive interior component including a skin made of the slush moldable polymeric composition is also provided. To provide haptics that are desirable to a consumer and also meet certain application requirements, the skin, in at least one embodiment, is formed by slush molding and has a certain range of physical and material properties. It should be understood, however, that while sluch molding is described as the predominant manufacturing technique in using this composition, that this composition can be used in other manufacturing processes, such as vacuum forming.

In at least one embodiment, the skin may be 0.3 to 3.0 mm thick, in another embodiment 0.5 to 2.0 mm thick, in yet another embodiment 0.75 to 1.5 mm thick, and in still yet another embodiment 1.0 mm thick. The Shore A hardness and the density of the skin play are two characteristics that heavily influence the haptics of the skin. In at least one embodiment, the skin may have a Shore A hardness of 60 to 90 as measured using ASTM D2240 with a 15 second dwell time. In another embodiment the Shore A hardness is 65 to 85, and in yet another embodiment 70 to 80. The density of the skin in at least one embodiment may be from 0.95 to 1.15 g/cm$^3$ as measured using ASTM D792. In yet another embodiment, the density is 1.0 to 1.10 g/cm$^3$, and in another embodiment 1.03 g/cm$^3$.

For skins that will be used in certain components, such as those involved with an air bag, it is desirable for the physical and material properties to meet certain criteria. In at least one embodiment, the tear strength is from 15 to 35 kN/m as measured using ISO 34 Method B ASTM D624. In another embodiment the tear strength is from 20 to 30 kN/m, and in yet another embodiment 25 kN/m. In at least one embodiment, the tensile strength is from 3.0 to 6.0 MPa as measured using ISO 527 Type 1B at 500 mm/min. The tensile strength is from 4.0 to 5.0 MPa in another embodiment, and 4.5 MPa in yet another embodiment. The elongation at break in at least one embodiment is at least 100% as measured using ISO 527 Type 1B at 500 mm/min. In another embodiment the elongation at break is at least 125%, in yet another embodiment at least 200%, in still yet another embodiment at least 250%, and in still further another embodiment at least 300%.

In certain instances, the resistance to marring and porosity are also properties of concern for the skin. In at least one embodiment, the loss of gloss is less than 5% when measured using test method FLTM BN107-01, and in other embodiments, less than 2.5%. The porosity of the skin can have a substantial impact on the feel, look, and performance of the skin. As examined under light microscope at 50× magnification, the porosity of the skin may be from 0% to 2% in at least one embodiment, 0% to 1% in another embodiment, and substantially 0% in yet another embodiment.

Figure 1B:
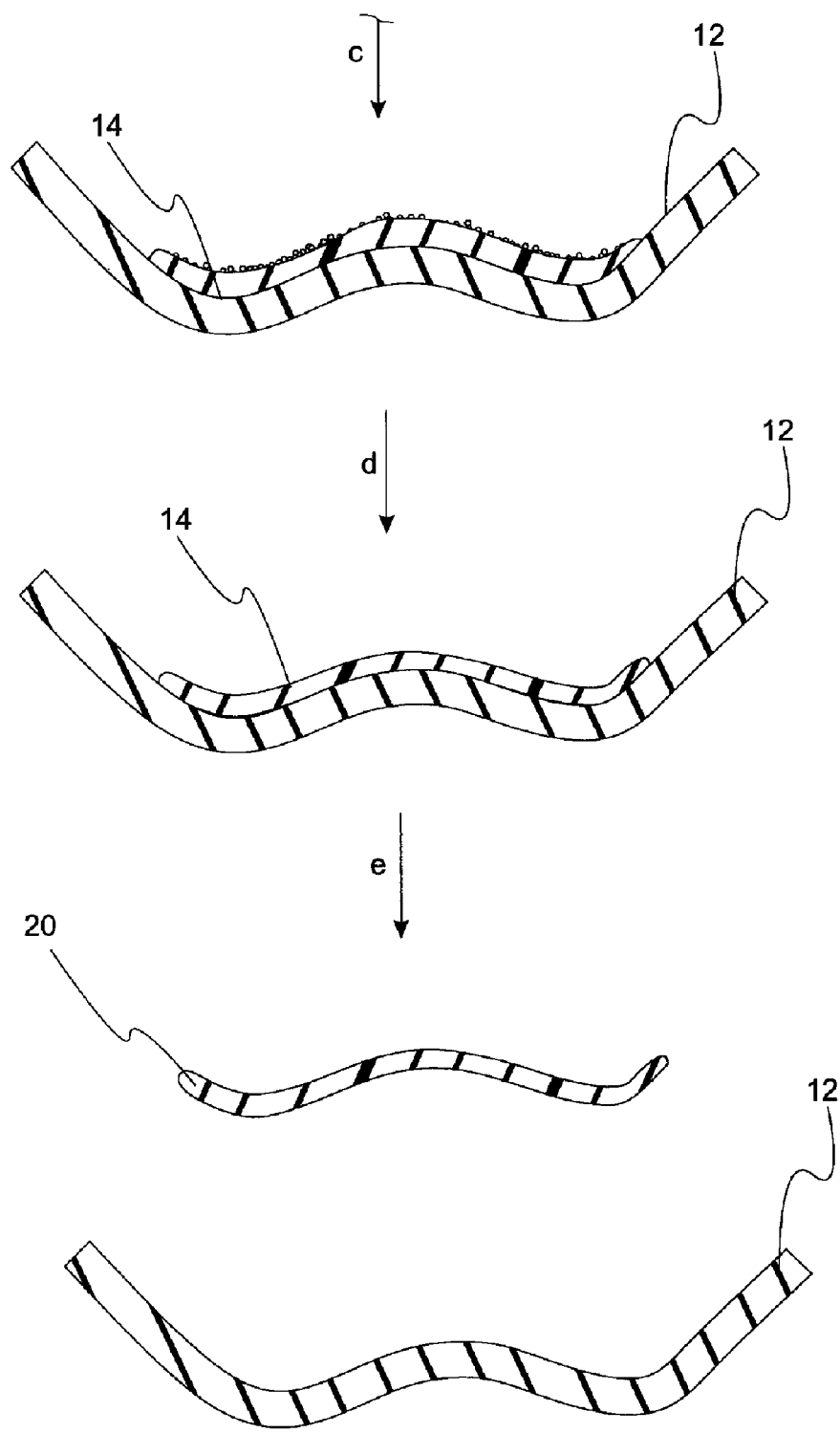

With reference to FIGS. 1A and 1B, a pictorial flowchart depicting a slush molding method for forming an instrument panel skin is provided. The method of this embodiment comprises a first step a) of introducing a urethane-based resin composition 10 into mold tool 12. The composition 10 may be made into small particles suitable for slush molding by any of the methods well known in the art, such as cryogenic grinding. At least a portion of mold tool 12 is made from a metal such as stainless steel or nickel. Urethane-based resin composition 10 comprises a thermoplastic urethane elastomer composition and at least one modifier. Suitable compositions for the thermoplastic urethane elastomer composition are the light stable aliphatic thermoplastic urethane elastomers set forth in U.S. Pat. Nos. 5,824,738 and 6,187,859. The entire disclosures of these patents are incorporated by reference in their entirety.

In a subsequent step b), urethane based resin composition 10 is heated to a sufficient temperature to form layer 14 over at least a portion of mold tool 12. In one refinement, urethane based resin composition 10 is heated to a temperature between about 170° C. and 260° C. In step c), excess powder is poured out from mold tool 12. The mold tool 12 is further heated, if necessary, in step d) so that the remaining powder melts. Finally, instrument panel skin 20 is removed from mold tool 12 is step e).

Figure 2:
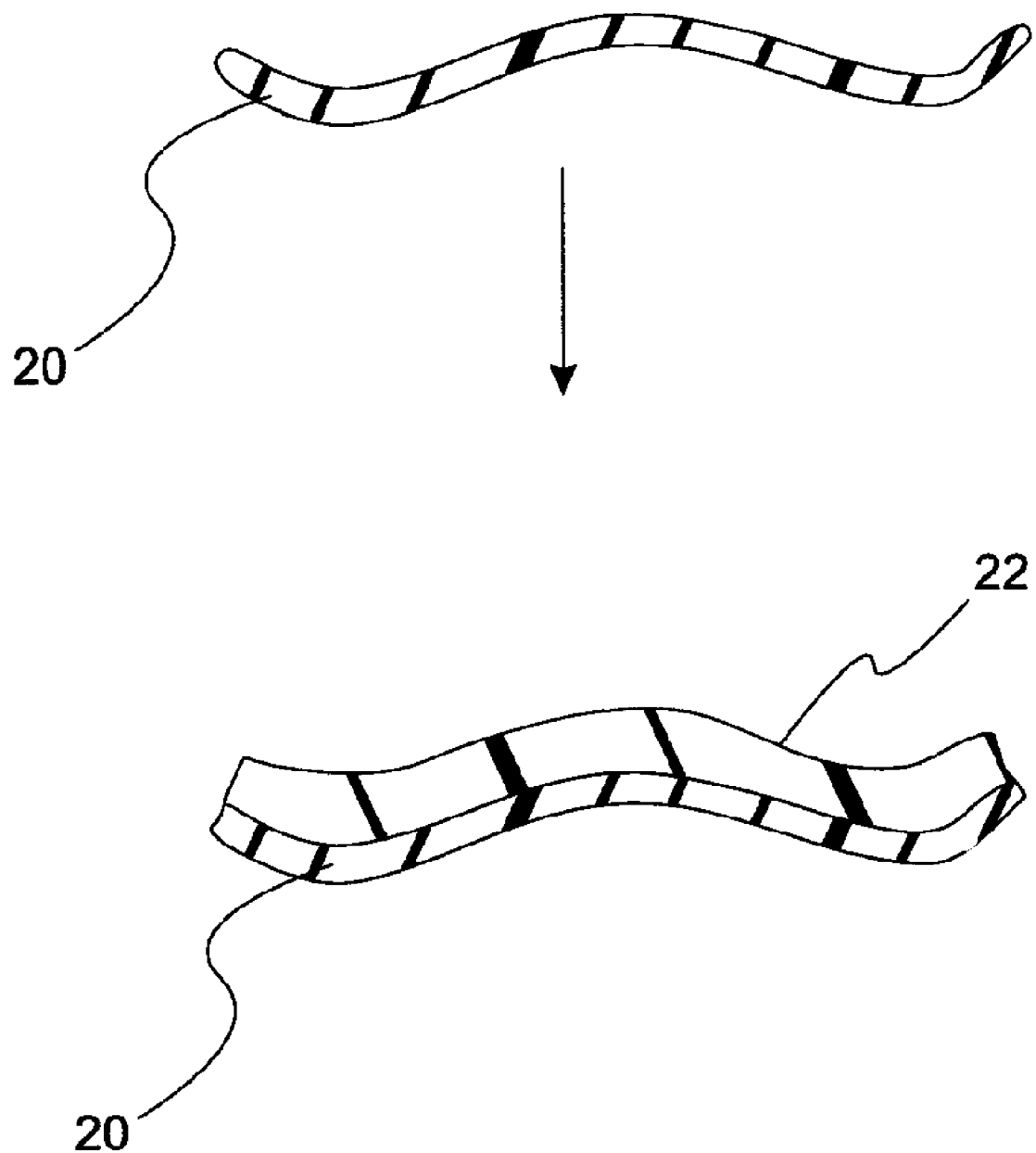
FIG. 2 is a pictorial flowchart depicting the application of a support structure to an instrument panel skin.

With reference to FIG. 2, a flowchart showing the application of a backing to instrument panel skin 20 is provided. In step f), structural component 22 is applied to instrument panel skin 20. Such structural components are applied by any number of methods known to those skilled in the art. In one refinement, structural component 22 has a thickness from about 2 mm to about 20 mm. In some variations, foam resins such as Dow Specflex NM815 are utilized. In one variation, skin 22 may be placed in a mold that provides a predetermined shape and a urethane backing sprayed over the back of instrument panel skin 20. In another variation, structural component 22 can be molded onto instrument panel skin 20. In such circumstances thermoplastic resins may be used.

In one embodiment, mold tool 12 may have a textured surface that contacts urethane-based composition 10 to impart a textured surface onto instrument panel skin 20.

In at least one embodiment of the present invention, the urethane-based composition 10 comprises from 50% to 99% urethane elastomer, in another embodiment 55% to 85%, and in yet another embodiment 60% to 73%. Modifiers may comprise from 1% to 50% of the composition, in another embodiment 15% to 45%, and in yet another embodiment 27% to 40%. The above percents, and other composition percents, are wt. percents unless otherwise specified.

In at least one embodiment, the urethane elastomer is thermoplastic and an aliphatic urethane elastomer comprising polyoxypropylene oxide diol. The polyoxypropylene oxide diol may be capped to provide primary hydroxyl end groups. The polyoxypropylene oxide diol may have a molecular weight from 2,000 to 6,000, in another embodiment 3,000 to 5,000, or in yet another embodiment 4,000. Examples of acceptable urethane elastomers are Bayer Texin DP7-3042 and Huntsman L448-205.

In another embodiment, the urethane elastomer may include residues of a composition having a polyol and an organic diisocyanate. In a refinement, the thermoplastic urethane elastomer includes a chain extender. In a further refinement, the urethane base resin further includes a hindered amine light stabilizer and/or a benzotriazole ultraviolet stabilizing agent.

As set forth above, the urethane elastomer may include the residues of a polyol. Suitable polyols are disclosed in U.S. Pat. Nos. 5,824,738 and 6,187,859. Specific examples, include, but are not limited to polyether polyols. In a variation, the polyol is formed in a process utilizing an organometallic catalyst that results in a polyol having a low level of terminal unsaturation. In one refinement, the polyol has a level of terminal unsaturation less than about 0.04 meq/g. In another refinement, the polyol has a level of terminal unsaturation less than about 0.02 meq/g. A representative example of such a polyol is Poly L 255-28 (sold by Olin corporation, Stamford, Conn.). Poly L 255-28 is a ethylene oxide capped poly(propylene oxide) polyol with an approximate molecular weight of 4000 and a hydroxyl number of 28. The polyol component can be present in amounts ranging from approximately 40% to 70% of the total weight of the thermoplastic urethane elastomer composition. In a refinement, the polyol is present in an amount between 40% and 60% of the total weight of the thermoplastic urethane elastomer composition. The amount of polyol is adjusted in this range to vary the hardness of the elastomer produced.

In a variation of the present embodiment, the thermoplastic urethane elastomer composition includes a chain extending agent. Suitable chain extending agents include aromatic secondary or aliphatic primary or secondary diamines, ethylene glycol, diethylene glycol, propylene glycol, pentane diol, 3-methylpentane-1,5-diol, hexane diol, HQEE [hydroquinone bis(2-hydroxyethyl)ether], CHDM (1,4-cyclohexanedimethanol), and HBPA (hydrogenated bisphenol A). A particularly useful chain extender is 1,4-butanediol. In a refinement, such chain extenders are present in concentrations varying from 6% to 15% of the total weight of the thermoplastic urethane elastomer composition. In another refinement, the chain extenders are present in an amount from 7% to 13% of the total weight of the thermoplastic urethane elastomer composition.

The thermoplastic urethane elastomer composition used in the present embodiment includes one or more isocyanates. Suitable isocyanates include aliphatic organic diisocyanates, or mixture of diisocyanates. Specific examples of organic isocyanates include, but are not limited to, (TMXDI) meta-tetramethylxylene diisocyanate and paratetramethylxylene diisocyanate, isophorone diisocyanate (IPDI), dibenzyl diisocyanate, xylene diisocyanate (XDI), 3,3'-bis toluene-4,4-diisocyanate, hexamethylene diisocyanate (HDI), hydrogenated MDI, hydrogenated XDI, cyclohexane diisocyanate, paraphenylene diisocyanate, mixtures and derivatives thereof and the like. In a refinement, the organic diisocyanates are present in an amount from 20% to 50% of the total weight of the thermoplastic urethane elastomer composition. In another refinement, the organic diisocyanates are present in an amount from 25% to 40% of the total weight of the thermoplastic urethane elastomer composition.

As set forth above, the thermoplastic urethane elastomer composition may include an ultraviolet stabilizing agent. Suitable ultraviolet stabilizing agents may include a combination of a hindered amine light stabilizers (HALS) and a benzotriazole. Examples of HALS include, but are not limited to, bis(1,2,2,6,6-pentamethyl-1-4-piperidinyl)sebacate (Chemical Abstract Number 41556-26-7, also known as Tinuvin 292 or 765 Ciba-Geigy Corp., Hawthorne, N.Y.). Examples of benxotriazoles include hydroxyphenyl benzotriazoles such as a benzotriazole mixture of poly (oxy-1,2-ethanediyl), alpha-[3-[3-(2H-benzotriazol-2-yl)-5-(1,1-dimethylethyl)-4-hydroxyphenyl]-1-oxopropyl]-omega-hydroxy- and poly(oxy-1,2-ethanediyl), alpha-[3-[3-(2H-benzotriazol-2-yl)-5-(1,1-dimethylethyl)-4-hydroxyphenyl]-1-oxopropyl)-omega-[3-[(2H-benzotriazol-2-yl)-5-(1,1,-dimethylethyl)-4-hydroxyphenyl]-1-oxopropoxy)-, Chemical Abstract Number 104810-47-1 and polyethylene glycol with a molecular weight of 300 Chemical Abstract Number 25322-68-3 (also known as Tinuvin 1130 or 213 Ciba-Geigy Corp., Hawthorne, N.Y.) and any other suitable ultraviolet stabilizing agents. In a refinement, the combination of ultraviolet stabilizing agent are present in a ratio in a range of approximately 1:1 to 2:1 by weight. In another variation, the total concentration of ultraviolet stabilizing agents are present in an amount from about 0.5 to 2.0%, of the total weight of the urethane elastomer composition.

In another variation of the present invention, the urethane elastomer composition includes an antioxidant. Virtually any suitable antioxidant, or mixture of antioxidants, may be used in the practice of the present invention. Representative examples include, but are not limited to, Irganox 1010 [tetrakis (methylene(3,5-di-tert-butyl-4-hydroxycinnamate)] methane from Ciba-Geigy; Irganox 1076 [Octodecyl 3,5 di-tert-butyl-4-hydroxyhydrocinnamate] from Ciba-Geigy; Irganox 245 [Ethylenebis (oxyethylene)bis-(3-tert-butyl-4-hydroxy-5-methylhydrocinnamate)] from Ciba-Geigy; and Vanox 830 (a proprietary blend of a phenolic compound, alkylated diphenylamines and trialkyl phosphite from R. T. Vanderbilt). The antioxidants may be present at a total concentration in a range of approximately 0.10% to 1.0% of the total weight of the urethane elastomer composition. In another refinement, the antioxidants may be present at a total concentration in a range of approximately 0.25% to 0.75% of the total weight of the urethane elastomer composition.

In at least one embodiment of the present invention, the modifiers may comprise a propylene copolymer, such as propylene-ethylene copolymer. The preferred propylene copolymer is propylene-ethylene copolymer, and as such, the propylene copolymer will be described hereinafter as propylene-ethylene copolymer. However, it should be understood that the description of the propylene-ethylene copolymer can apply to other propylene copolymers such as propylene-butylene and the like. The propylene-ethylene copolymer may comprise 0.1% to 15% of the urethane-based composition, in another embodiment 2.5% to 10%, and in yet another embodiment 5.0% to 7.5%. The copolymer may have a narrow molecular weight distribution (about 2 to 3) and a broad crystallinity distribution. The copolymer may have a density of 0.7 to 1.0 $g/cm^3$, in another embodiment of 0.75 to 0.95 $g/cm^3$, in yet another embodiment of 0.8 to 0.9 $g/cm^3$, and in still yet another embodiment of 0.85 $g/cm^3$. The copolymer may have a melt flow rate of 1 to 30 dg/min, in another embodiment of 2 to 25 dg/min, in yet another embodiment of 2 to 15 dg/min, in still yet another embodiment of 2 to 10 dg/min, in still yet another further embodiment of 2 to 5 dg/min, and in still yet even another further embodiment of 2 dg/min. The copolymer may have a total crystallinity of 1% to 20%, in another embodiment of 5% to 10%, in yet another embodiment of 6% to 8%, and in still yet another embodiment of 7%.

The propylene-ethylene copolymer may have a Shore A hardness of 50 to 75, in another embodiment of 60 to 70, in yet another embodiment of 65 to 70, and in still yet other embodiment of 68. The copolymer may have a glass transition temperature of $-40$ to $-15°$ C., in still another embodiment of $-35$ to $-25°$ C., in yet another embodiment of $-35$ to $-30°$ C., and in still another embodiment of $-33°$ C. The copolymer may have an ultimate tensile strength of 700 to 1,000 psi, in another embodiment of 800 to 900 psi, in yet another embodiment of 825 to 875 psi, and in still yet another embodiment of 860 psi. The copolymer may have a flexural modulus of 1,000 to 40,000 psi, in another embodiment of 2,000 to 35,000 psi, in yet another embodiment of 2,000 to 10,000 psi, in still yet another embodiment of 2,000 to 5,000 psi, and in still yet another further embodiment of 2,000 psi. An example of an acceptable propylene-ethylene copolymer is VERSIFY™ 2400 Elastomer from Dow®.

In at least one embodiment of the present invention, the modifiers may comprise an olefin modified thermoplastic, such as styrene block copolymers, such as a styrene-ethylene-butadiene-styrene (SEBS) block copolymer. The preferred olefin modified thermoplastic is the styrene block copolymer SEBS, and as such, the olefin modified copolymer will be described hereinafter as SEBS. However, it should be understood that the description of the SEBS can apply to other olefin modified thermoplastics, such as styrene-isoprene (SI) copolymer, styrene-butadiene (SB) copolymer, styrene-ethylene-propylene-styrene(SEPS) copolymer and the like. The SEBS copolymer may comprise 0.1% to 25% of the urethane-based composition, in another embodiment of 5% to 22.5%, in yet another embodiment of 7.5% to 15%, and in still yet another embodiment of 10%. The SEBS copolymer may have a Shore A hardness of 45 to 65, in another embodiment of 50 to 60, and in yet another embodiment of 53. The copolymer may have a density of 0.8 to 1.1 $g/cm^3$, in another embodiment of 0.95 to 1.05 $g/cm^3$, in yet another embodiment of 1.0 to 1.05 $g/cm^3$, and in still yet another embodiment of 1.04 $g/cm^3$. The copolymer may have an ultimate tensile strength of 1.0 to 4.5 MPa. The copolymer may have an ultimate elongation of 500% to 700%, and in yet another embodiment of 600%. The SEBS may have a melting temperature of 95° C. to 110° C. An example of an acceptable SEBS block copolymer is Santoprene 8211 55B100.

In at least one embodiment of the present invention, the modifiers may comprise olefinic block copolymers (OBC) having a broader molecular weight distribution and higher melting and crystallization temperatures than traditional SEBS block copolymers. The olefinic block copolymer may have a variable distribution of block lengths, as opposed to traditional block copolymers which typically have nearly the same block lengths throughout. The blocks may also alternate as relatively hard/rigid and soft blocks. The olefinic block copolymer may be present in the urethane-based composition in an amount from 0.1% to 30%, in yet another embodiment of 2.5% to 20%, in another embodiment, and still yet another embodiment of 5.0% to 12.5%.

The olefinic block copolymers may have a melt flow rate of 0.25 to 1.5 dg/min, and in yet another embodiment of 0.5 to 1.0 dg/min. The copolymers may have a density of 0.7 to 1.0 g/cm$^3$, in another embodiment of 0.8 to 0.9 g/cm$^3$, in yet another embodiment of 0.85 to 0.88 g/cm$^3$, and in still yet another embodiment of 0.877 g/cm$^3$. The copolymer may have a Shore A hardness of 60 to 80, in another embodiment of 70 to 80, and in yet another embodiment of 75. The copolymer may have a melting point of at least 100° C., in yet another embodiment at least 110° C., in yet another embodiment at least 115° C., and in still yet another embodiment of 120° C. The copolymer may have an ultimate tensile strength of 2,000 to 3,000 psi, in another embodiment of 2,250 to 2,750 psi, and in yet another embodiment of 2,500 to 2,650 psi. The copolymer may have an ultimate tensile elongation of 1,000% to 2,000%, in another embodiment 1,250% to 1,750%, in yet another embodiment of 1,400% to 1,700%, and in still yet another embodiment 1,477% to 1,673%. Examples of acceptable olefinic block copolymers are those from the Dow® INFUSE™ line, such as D9000.00, D9000.05, and D9100.05.

Improvements in the physical properties, such as tensile strength, percent elongation, and tear strength of the tunable polymeric composition may be achieved by the addition of surface modified montmorillonite nanoclays, such as Cloisite 93A and Cloisite 30B from Southern Clay Products. The nanoclays may be modified with a quaternary ammonium salt. In at least one embodiment, the nanoclay is present in the composition in the amount of 0% to 3.0%, in another embodiment of 0.5% to 2.5%, in yet another embodiment of 1.0% to 2.0%, and in still yet another embodiment of 1.5%. Addition of nanoclays within these ranges may be advantageous for automotive interior components involved in air bag deployment, particularly at low temperatures (e.g. −30° C.).

In at least one embodiment of the present invention, the tunable polymeric composition comprises at least two of the afore-mentioned modifiers, in another embodiment at least three modifiers, and in yet another embodiment at least four modifiers. For example, the tunable polymeric composition may comprise urethane elastomer, a propylene-ethylene copolymer, a SEBS block copolymer, and an olefinic block copolymer as described previously.

Urethane-based composition 10 may optionally further include one or more pigments. In at least one embodiment, the pigments are present in an amount from 0% to 10% of the urethane-based composition, in another embodiment 0.1% to 8.0%, and in yet another embodiment 2.0% to 7.0%. In at least certain embodiments, pigments based on TPU-based and/or olefinic-based concentrates have been found to be particularly suitable. In at least certain embodiments, the pigment concentrates comprise pigment dispersed in TPU and/or olefinic carriers having let down ratios of 25:1 to 50:1 of pigment to carrier. Examples of suitable olefin-based pigment concentrates include Americhem DX9 50437-HI-106 from Americhem and TPU-based pigment concentrates include Clariant 2N4A from Clariant Master Batches.

The following examples illustrate the various embodiments of the present invention. Those skilled in the art will recognize many variations that are within the spirit of the present invention and scope of the claims.

Table 1 provides suitable ranges of some of the components in the composition.

Table 2 provides the compositions of several test samples that were used to form skin layers via a slush molding process at 260° C. for 10 minutes.

Table 3 provides test data on the physical and material properties for some of the test samples in Table 2.

TABLE 1

Component ranges

| Component | First Embodiment | Second Embodiment | Third Embodiment |
|---|---|---|---|
| urethane elastomer | 50% to 99% | 55% to 85% | 60% to 70% |
| propylene-ethylene copolymer | 0.1% to 15% | 2.5% to 10% | 5.0% to 7.5% |
| SEBS | 0.1% to 25% | 5.0% to 22.5% | 7.5% to 15% |
| olefinic block copolymer | 0.1% to 30% | 2.5% to 20% | 5.0% to 12.5% |
| nanoclay | 0% to 3.0% | 0.5% to 2.5% | 1.0% to 2.0% |
| pigment | 0% to 10% | 0.1% to 8.0% | 2.0% to 7.0% |

TABLE 2

Sample Compositions

| Sample | 1 | 2 | 3 | 4 | 5 | 6 | 7 | 8 |
|---|---|---|---|---|---|---|---|---|
| Bayer Texin DP7-3042 | 63.00% | 63.00% | 73.00% | 63.00% | | | | |
| Huntsman L448-205 | | | | | 67.50% | 67.00% | 66.60% | 66.00% |
| Dow Versify 2400 | 7.50% | 5.00% | 5.00% | 7.50% | 7.50% | 7.50% | 7.50% | 7.50% |
| Exxon Mobil Santoprene 8211 55B100 | 10.00% | 10.00% | 10.00% | 10.00% | 10.00% | 10.00% | 10.00% | 10.00% |
| Dow Infuse OBC D9000.00 | 12.50% | 5.00% | | | | | | |
| Dow Infuse OBC D9000.05 | | | | | 12.50% | 12.50% | 12.50% | 12.50% |
| Dow Infuse OBC D9100.05 | | | 5.00% | 12.50% | | | | |
| ACI ORI 3116 | | 10.00% | | | | | | |

TABLE 2-continued

Sample Compositions

| Sample | 1 | 2 | 3 | 4 | 5 | 6 | 7 | 8 |
|---|---|---|---|---|---|---|---|---|
| Southern Clay Cloisite 93A | | | | | 0.50% | 1.00% | 1.40% | 2.00% |
| Coloring agent | 7.00% | 7.00% | 7.00% | 7.00% | 2.00% | 2.00% | 2.00% | 2.00% |
| Total | 100.00% | 100.00% | 100.00% | 100.00% | 100.00% | 100.00% | 100.00% | 100.00% |

TABLE 3

Test results

| Sample No. | Method | Requirements | 1 | 2 | 3 | 4 | 5 | 6 | 7 | 8 |
|---|---|---|---|---|---|---|---|---|---|---|
| Skin Thickness (mm) | ISO 4593 ASTM D374 | | 1.0 | 1.0 | 1.1 | 1.1 | 1.0 | 1.0 | 1.0 | 1.0 |
| Hardness Shore "A" | ASTM D2240 15 s dwell | 60-90 | 47.9 | 70 | 56 | 56 | 69 | 71 | 65 | 69 |
| Tear Strength (kN/m) | ISO 34 Meth. B ASTM D624, Die C 50 mm/min | 10 kN/m | 21 | 20.2 | 33 | 24 | 22.9 | 25.0 | 26.4 | 26.3 |
| Tensile Strength (MPa) | ISO 527 Type 1B 500 mm/min | 5.0 MPa | 4.6 | 2.9 | 5.3 | 3.8 | 4.08 | 4.33 | 4.55 | 4.14 |
| Elongation at break (%) | ISO 527 Type 1B 500 mm/min | 95% min. | 137 | 134 | 355 | 173 | 248 | 280 | 267 | 266 |
| Density (g/cm$^3$) | ASTM D792 | none | 1.03 | 1.04 | 1.06 | 1.03 | 1.03 | 1.03 | 1.07 | 1.03 |
| Resistance to Marring (Scale 1-5) | FLTMBN107091 (Dry) | >3.5 | 4.0 | 3.5 | 3.5 | 4.0 | 4.0 | 5.0 | 5.0 | 5.0 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A polymeric composition comprising:
   a) from 50 to 99 wt. percent urethane elastomer;
   b) from 0.1 to 15 wt. percent propylene copolymer;
   c) from 0.1 to 25 wt. percent olefin modified thermoplastic; and
   d) from 0.1 to 30 wt. percent olefinic block copolymer having a variable distribution of block lengths;
   wherein the polymeric composition is slush moldable and vacuum formable.

2. The composition of claim 1, wherein the olefinic block copolymer is present in an amount from 5.0 to 12.5 wt. percent.

3. The composition of claim 1, wherein the olefin modified thermoplastic comprises SEBS block copolymer present in an amount from 7.5 to 15 wt. percent and has a Shore A hardness of 50 to 60 and a density of 0.95 to 1.05 g/cm$^3$.

4. The composition of claim 1, wherein the propylene copolymer comprises propylene-ethylene copolymer present in an amount from 5 to 7.5 wt. percent and has a Shore A hardness of 60 to 70, a percent crystallinity of no more than 20 wt. percent and a density of 0.8 to 0.9 g/cm$^3$.

5. The composition of claim 1, further comprising 0.5 to 2.5 wt. percent of a surface modified montmorillonite nanoclay.

6. The composition of claim 1, further comprising no more than 10 wt. percent of an olefin- or TPU-based pigment.

7. The composition of claim 1, wherein the urethane elastomer is present in an amount from 60 to 70 wt. percent.

8. The polymeric composition of claim 1, wherein the composition comprises:
   a) from 60 to 70 wt. percent urethane elastomer;
   b) from 5.0 to 7.5 wt. percent propylene-ethylene copolymer;
   c) from 7.5 to 15 wt. percent SEBS;
   d) from 5.0 to 12.5 wt. percent olefinic block copolymer; and
   e) from 0.5 to 2.5 wt. percent surface modified montmorillonite nanoclay;
   wherein the polymeric composition is slush moldable.

9. The composition of claim 2, wherein the olefinic block copolymer has a Shore A hardness of 70 to 80 and a density of 0.8 to 0.9 g/cm$^3$.

10. The composition of claim 5, wherein the surface modified montmorillonite nanoclay is present in an amount from 1.0 to 2.0 wt. percent.

11. The composition of claim 8, further comprising 0.1 to 8.0 wt. percent pigment.

12. A skin for a vehicle interior component, the skin comprising the dried product of a composition comprising:
   a) from 50 to 99 wt. percent urethane elastomer;
   b) from 0.1 to 15 wt. percent propylene-ethylene copolymer;
   c) from 0.1 to 25 wt. percent SEBS; and
   d) from 0.1 to 30 wt. percent olefinic block copolymer having a variable distribution of block lengths; and
   wherein the skin has a thickness from 0.3 to 3.0 mm and a Shore A hardness from 60 to 90.

13. The skin of claim 12, wherein the Shore A hardness is from 65 to 85.

14. The skin of claim 12, wherein the Shore A hardness is from 70 to 80.

15. The skin of claim 12, wherein the skin has a porosity of less than 2.0%.

16. The skin of claim 12, wherein the tensile strength of the skin is from 3.0 to 6.0 MPa.

17. The skin of claim 12, wherein the tear strength of the skin is from 15 to 35 kN/m.

18. The skin of claim 12, wherein the density of the skin is from 1.0 to 1.10 g/cm$^3$.

19. A method of forming a skin for a vehicle interior component, the method comprising:
  providing particles having a polymeric composition comprising:
   a) from 60 to 70 wt. percent urethane elastomer;
   b) from 5.0 to 7.5 wt. percent propylene-ethylene copolymer;
   c) from 7.5 to 15 wt. percent SEBS;
   d) from 5.0 to 12.5 wt. percent olefinic block copolymer having a variable distribution of block lengths; and
   e) from 0.5 to 2.5 wt. percent surface modified montmorillonite nanoclay; providing a mold tool; introducing the mold tool into a container having the polymeric particles disposed therein; disposing the particles onto the mold tool; heating the mold tool to form a layer of polymeric material over at least a portion of the mold tool; cooling the polymeric material to form a skin over the mold tool; and removing the mold tool from the container; wherein the skin that is formed has a thickness from 0.3 to 3.0 mm and a Shore A hardness from 60 to 90.

20. The method of claim 19 wherein component, the method comprises:
  providing a sheet having a composition comprising:
   a) from 60 to 70 wt. percent urethane elastomer;
   b) from 5.0 to 7.5 wt. percent propylene-ethylene copolymer;
   c) from 7.5 to 15 wt. percent SEBS;
   d) from 5.0 to 12.5 wt. percent olefinic block copolymer; and
   e) from 0.5 to 2.5 wt. percent surface modified montmorillonite nanoclay;
  providing a mold tool;
  heating the sheet such that it becomes pliable;
  disposing the sheet over the mold tool;
  applying a vacuum to the mold tool, causing the sheet to substantially have the shape of the mold tool; and
  removing the formed skin from the mold tool;
  wherein the skin that is formed has a thickness from 0.3 to 3.0 mm and a Shore A hardness from 60 to 90.

\* \* \* \* \*